May 30, 1939. K. H. BARBOUR 2,160,053
WIRELESS AERIAL SYSTEM
Filed Feb. 25, 1937
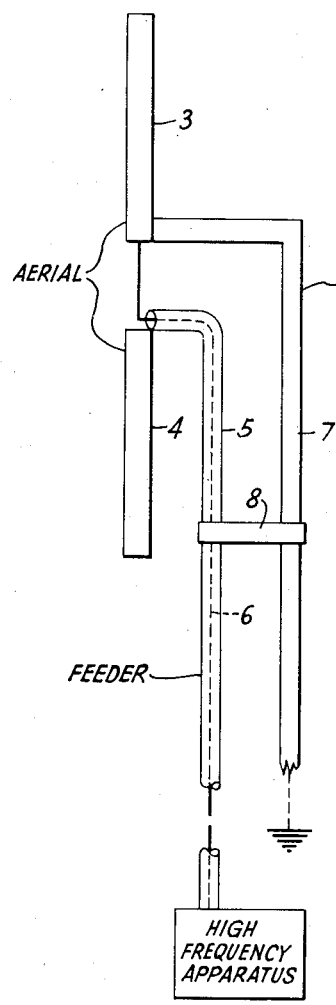
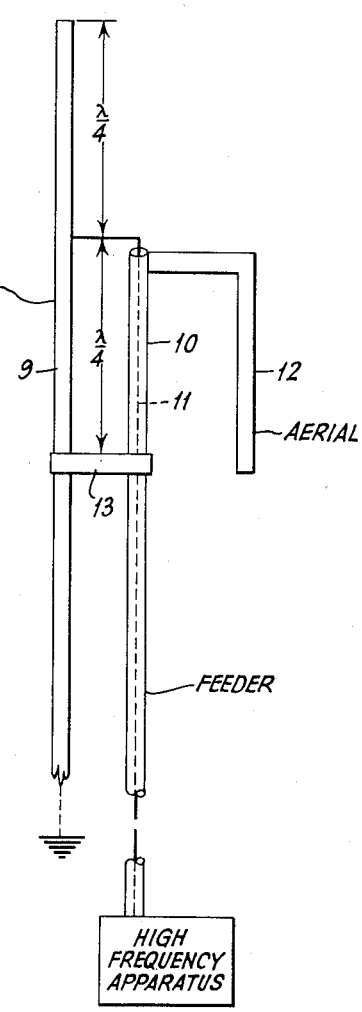
INVENTOR
KENNETH HEYWARD BARBOUR Patented May 30, 1939

2,160,053

UNITED STATES PATENT OFFICE 2,160,053

WIRELESS AERIAL SYSTEM

Kenneth Heyward Barbour, Ealing, London, England, assignor to Electric & Musical Industries Limited, Hayes, Middlesex, England, a British company Application February 25, 1937, Serial No. 127,632
In Great Britain March 3, 1936

4 Claims. (Cl. 250—33)

This invention relates to wireless aerial systems.

In wireless systems for transmitting or receiving signals at relatively short wavelengths, such as for transmitting or receiving television signals, it is often required to arrange an aerial in an exposed position such, for example, as at the top of a mast or on the top of a building, the aerial being coupled to the transmitting or receiving apparatus by means of a feeder. It is then desirable to provide the mast, or other structure on which the aerial is mounted, with a lightning conductor.

When a lightning conductor is mounted near an aerial, the characteristics of the aerial are disturbed to a considerable extent and its efficiency is impaired. Furthermore, the lightning conductor also acts as a source of interfering signals, which signals become impressed upon the aerial itself and, in the case of reception, are propagated down the feeder to the receiver connected thereto.

It is an object of the present invention to provide a short wave aerial system incorporating a lightning conductor in which the above-mentioned difficulties are overcome or substantially reduced.

According to the present invention, an aerial system is provided including a dipole aerial and comprising a concentric feeder and a lightning conductor, the lightning conductor being connected to the sheath of the feeder at a predetermined position along its length so as to function as an auxiliary conductor forming part of a tuned circuit for increasing the attenuation of the sheath of the feeder to currents flowing along the outside thereof.

In one embodiment of the invention as applied to a dipole aerial, one element of the aerial is connected to the lightning conductor so that the aerial element forms part of the lightning conductor, and in another embodiment of the invention a portion of a lightning conductor constitutes one element of a dipole aerial.

In order that the said invention may be clearly understood and readily carried into effect, the same will now be more fully described with reference to the accompanying drawing in which:

Fig. 1 is a diagrammatic representation of one embodiment of the invention, and

Fig. 2 illustrates a further embodiment.

Referring now to Fig. 1 of the drawing, the aerial is in the form of a half wave dipole and comprises two conducting elements 3, 4, each of a length substantially equal to one-quarter of the wavelength of signals to be received. The two elements are arranged to lie in a vertical straight line, their adjacent ends being a few inches apart. The elements are preferably supported by suitable insulators, not shown, locally at or near their adjacent ends. A concentric feeder comprising a sheath 5 and central conductor 6 has one end of its central conductor connected to the lower end of the upper element 3, whilst the outer conductor or sheath 5 is connected to the upper end of the lower element 4. The feeder is arranged to extend horizontally, as shown, for a distance of a few inches away from the center of the dipole and it is then bent through a right angle so that it extends vertically downwards for a distance of at least several feet after which it may extend in any required direction in order to be connected to a transmitting or receiving apparatus.

The upper end of a lightning conductor 7 is attached to the lower end of the upper aerial element 3. The lightning conductor then extends, as shown, for a short distance, parallel with and vertically above the horizontal portion of the feeder, but spaced apart therefrom, and it is then bent to lie parallel with and spaced a few inches from the vertical part of the feeder. The other end of the lightning conductor is earthed at some convenient point in normal manner.

A conductive bridge 8 is provided between the lightning conductor and the sheath of the feeder and the position of the bridge is adjusted so as to cause the portion of the lightning conductor between the bridge 8 and the aerial to function as the auxiliary conductor of a rejector circuit in the manner described in British Patent No. 438,506. This portion of the lightning conductor then causes the outer surface of the sheath of the feeder to present a high impedance to the flow of current at the operating frequency along the outside of the sheath and flow of such current is thereby largely prevented. The lightning conductor 7 is connected as stated above to the lower end of the upper aerial element 3 which element therefore acts as a top section of the lightning conductor. If desired, the upper end of this element may be pointed.

If the aerial is to be used to receive signals on a carrier at a frequency of 45 megacycles per second, for example, the aerial elements 3 and 4 should each have a length of about 4 feet 11 inches and the length of the auxiliary conductor (that portion of the lightning conductor between its point of attachment to the upper aerial element and the bridge 8) should be about 4 feet 7 inches. The horizontal distance between the vertical part of the lightning conductor and the lower aerial element 4 is preferably not less than 6 inches and may, with advantage, be about 9 inches.

In another embodiment of the invention shown in Fig. 2, the lightning conductor comprises a vertical rod 9. Parallel thereto, and extending to one-quarter of a wavelength short of the upper end thereof, is arranged a concentric feeder comprising a sheath 10 and central conductor 11. The upper end of the central conductor of the feeder is connected to the nearest point of the lightning conductor, as shown. An aerial element 12 is connected at one of its ends to the upper end of the sheath 10 of the feeder. The aerial element then extends horizontally for a short distance and it is then bent vertically downwards, as shown. The feeder 10 the aerial element 12 and the lightning conductor 9 all have their axes in one vertical plane and the lightning conductor and the aerial element are located on oppositte sides of the feeder. A conducting bridge 13 is provided between a point on the sheath of the feeder 10, distance approximately one-quarter of a wavelength from the upper end of the feeder, and an adjacent point on the lightning conductor. In this arrangement the top quarter wavelength of the lightning conductor 9 acts as an aerial element and the quarter wavelength next below this acts as the auxiliary conductor of a rejector circuit described in the aforementioned British patent. The vertical part of the aerial element 12 is preferably spaced more than 6 inches from the feeder. The upper end of the lightning conductor 9 may be pointed.

In both the arrangements described in Figs. 1 and 2, the length of the lightning conductor between the bridge and earth and the length of feeder between the bridge and the apparatus to which it is connected at its lower end, do not affect the operation of the aerial, both the feeder and the lightning conductor being stabilized by the presence of the tuned rejector circuit.

The lightning conductor and any aerial element which acts as a part thereof must, of necessity, be of considerable cross-section. The use of a conductor of large cross-section is, however, an advantage if the aerial is to be used for television purposes since increasing the size of the aerial conductors flattens the response curve of the aerial and reduces side-band attenuation.

In the arrangements described, the efficiency obtained is substantially equal to that of the equivalent aerial without a lightning conductor and furthermore, the lightning conductor does not introduce interference into the aerial or feeder.

The invention has been described with particular reference to receiving aerials but it is equally applicable to transmitting aerials.

What is claimed is:

1. An aerial system including a vertical dipole aerial and comprising a concentric feeder and a lightning conductor, the lightning conductor being connected to the sheath of said concentric feeder at a predetermined position along its length so as to function as an auxiliary conductor forming a part of a tuned rejector circuit, the height of one end of the lightning conductor being at least as great as that of any part of the aerial and the other end of said conductor being separately grounded.

2. An aerial system comprising a vertical dipole aerial, a concentric feeder, the sheath of which is connected to the upper end of the lower section of said dipole while the inner conductor therefor is connected to the lower end of the upper section of said dipole, and a separate lightning conductor connected to said upper element and also to the sheath of the concentric feeder at a predetermined position along its length whereby a tuned rejector circuit is formed, the remote end of said lighting conductor being separately grounded whereby a connection to ground for lightning strokes is provided independent of said feeder.

3. An aerial system comprising a dipole antenna, a concentric feeder, the sheath of which is connected to one element of said dipole while the inner conductor thereof is connected to the other element of said dipole, and a separate lightning conductor connected to one of said elements and also to the sheath of the concentric feeder at a predetermined position along its length whereby a tuned rejector circuit is formed, one end of said lightning conductor extending at least as far upwardly as any portion of said dipole and the remote end of said lightning conductor being grounded whereby a connection to ground for lightning strokes is provided independent of said feeder.

4. An aerial system comprising a dipole antenna, a concentric feeder, the sheath of which is connected to one element of said dipole while the inner conductor thereof is connected to the other element of said dipole, and a separate lightning conductor connected to one of said elements and also to the sheath of the concentric feeder at a predetermined position along its length whereby a turned rejector circuit is formed, one end of said lightning conductor extending at least as far upwardly as any portion of said dipole and the remote end of said lightning conductor being separately grounded whereby a connection to ground for lightning strokes is provided independent of said feeder.

KENNETH HEYWARD BARBOUR.